United States Patent
Boers et al.

[15] 3,650,013
[45] Mar. 21, 1972

[54] LIMITED SLIP DIFFERENTIAL DISASSEMBLY METHOD AND TOOL THEREFOR

[72] Inventors: Jan H. Boers; Robert C. Rutherford; John R. Loquai, all of Owatonna, Minn.

[73] Assignee: Owatonna Tool Company

[22] Filed: July 15, 1970

[21] Appl. No.: 54,885

[52] U.S. Cl. .............................. 29/427, 29/200 D, 29/256, 29/258
[51] Int. Cl. .................. B23p 19/04, B23b 9/00, B25b 27/00
[58] Field of Search ................ 29/426, 427, 200 D, 256, 258

[56] References Cited

UNITED STATES PATENTS

| | | | |
|---|---|---|---|
| 1,980,156 | 11/1934 | Emrick | 29/426 X |
| 2,419,473 | 4/1947 | Travilla | 29/426 X |
| 2,748,454 | 6/1956 | Compton | 29/426 X |
| 2,872,728 | 2/1959 | Fraser | 29/256 |
| 3,012,311 | 12/1961 | Shupe | 29/200 |
| 3,158,930 | 12/1964 | Wesstrom | 29/426 X |
| 3,216,098 | 11/1965 | Ratz | 29/258 X |

Primary Examiner—Wayne A. Morse, Jr.
Attorney—Hofgren, Wegner, Allen, Stellman & McCord

[57] ABSTRACT

A tool for assembly and disassembly of a limited slip differential including a step plate engageable against one side gear of the differential, an internally-threaded member engageable against the other side gear of the differential, a forcing screw threadable into the threaded member and engageable with the step plate whereby rotation of the forcing screw forces increased separation of the side gears relative to each other by compressing of a Belleville spring between each side gear and the differential case to free the pinion mate gears for inward movement to remove washers associated therewith, and a handle member connected to the internally-threaded member extendable outwardly of the differential case and provided with a pawl engageable with a tooth on a side gear to result in rotation of the engaged side gear and a pair of pinion mate gears of the differential to cause the latter to walk on the other side gear until the pinion mate gears are positioned for removal through openings in the differential case, with the rotation of the handle being about an axis defined by the forcing screw, together with a method of disassembling a limited slip differential by use of a tool as described above.

14 Claims, 4 Drawing Figures

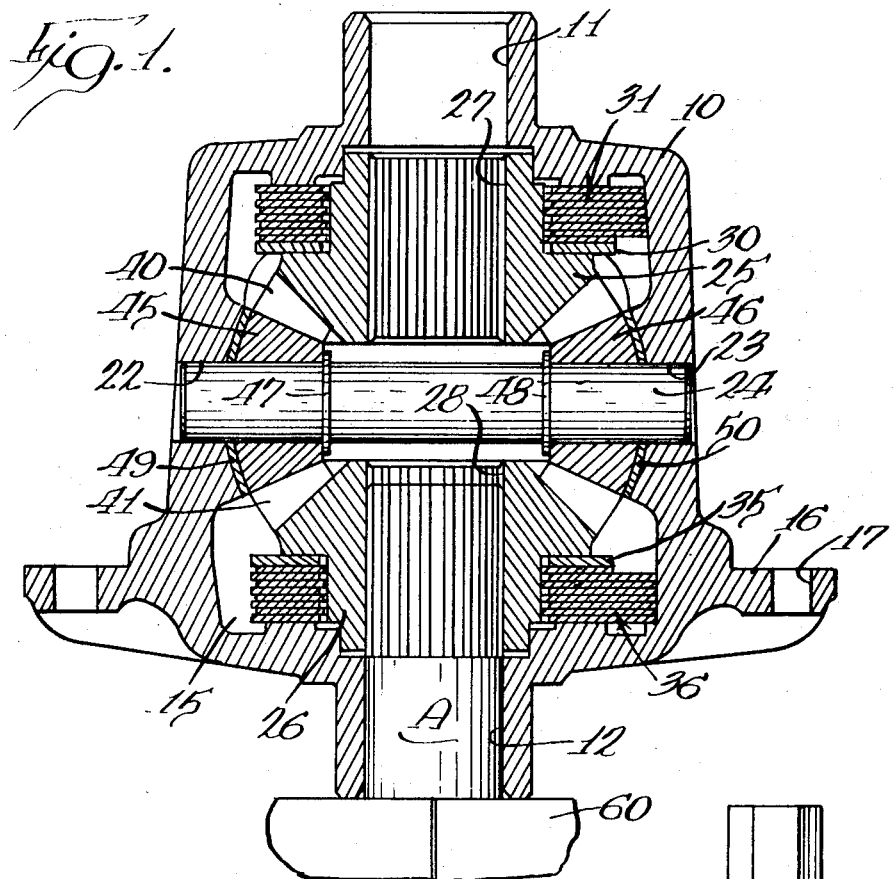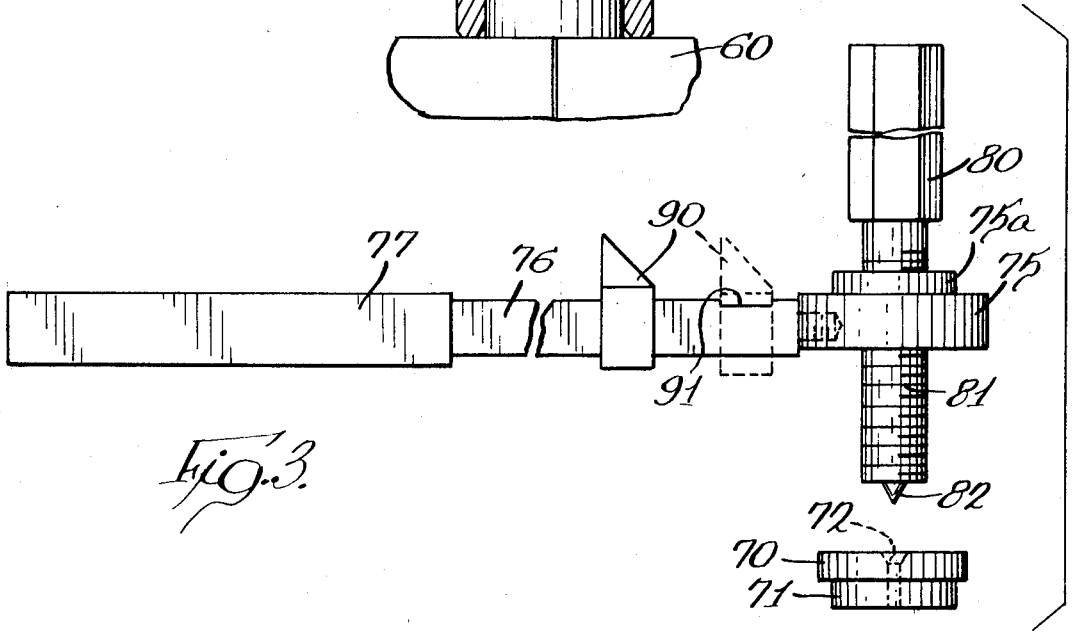

3,650,013

3,650,013

LIMITED SLIP DIFFERENTIAL DISASSEMBLY METHOD AND TOOL THEREFOR

BACKGROUND OF THE INVENTION

This invention pertains to a tool for assembly and disassembly of a limited slip differential and to the method of disassembling such a differential.

SUMMARY

An object of the invention is to provide a new and improved tool for assembly and disassembly of a limited slip differential wherein the side gears of the differential each has a clutch pack and Belleville spring associated therewith whereby the tool compresses the springs to facilitate removal of washers associated with the pair of pinion mate gears and wherein the structure for compressing said springs further defines an axis of rotation for a handle carrying a gear rotating tool or element which advances one of the side gears and the pinion mate gears to positions for removal of the pinion mate gears and other structure from the differential case.

Still another object of the invention is to provide a tool for assembly and disassembly of a limited slip differential having a step plate fittable into the central axle-receiving opening of one side gear of the differential, an internally threaded nut fittable into the axle-receiving opening of the other side gear and with an elongate handle connected thereto for extension outwardly of the differential case, a forcing screw positionable in the differential case and in the internally threaded nut whereby rotation of the forcing screw will exert forces in opposing relation against the pair of side gears to compress Belleville springs associated with each of the side gears to free the pinion mate gears for inward movement to permit removal of washers associated therewith, and a pawl positionable on the handle to engage a tooth on one side gear whereby rotation of the handle about an axis defined by the forcing screw causes rotation of the last-mentioned side gear and pinion mate gears until the latter gears are walked to positions to permit removal through openings in the differential case.

Still another object of the invention is to provide a method of disassembly of a limited slip differential having a pair of spaced-apart side gears meshing with a pair of pinion mate gears and with a clutch pack and Belleville spring between each side gear and the differential case comprising, removal of a cross pin passing through the pinion mate gears, positioning elements between opposing faces of said side gears and actuating said element to exert forces in directions to urge said side gears apart and compress the Belleville springs whereby the pinion mate gears can move inwardly to permit removal of spherical washers between the differential case and said pinion mate gears, substantially releasing said forces, holding one side gear against rotation, and rotating the other side gear by a member connected to one of said elements to rotate said pinion mate gears and walk the latter on said one side gear until the pinion mate gears are positioned for removal through openings in the differential case, followed by removal of said side gears and associated structure from the differential case.

BRIEF DESCRIPTION OF THE DRAWING

FIG. 1 is a vertical central section of a limited slip differential with the ring gear removed and mounted on an axle positioned in a vise;

FIG. 3 is a vertical assembly view of the tool; and

DESCRIPTION OF THE PREFERRED EMBODIMENT

Figure 2:
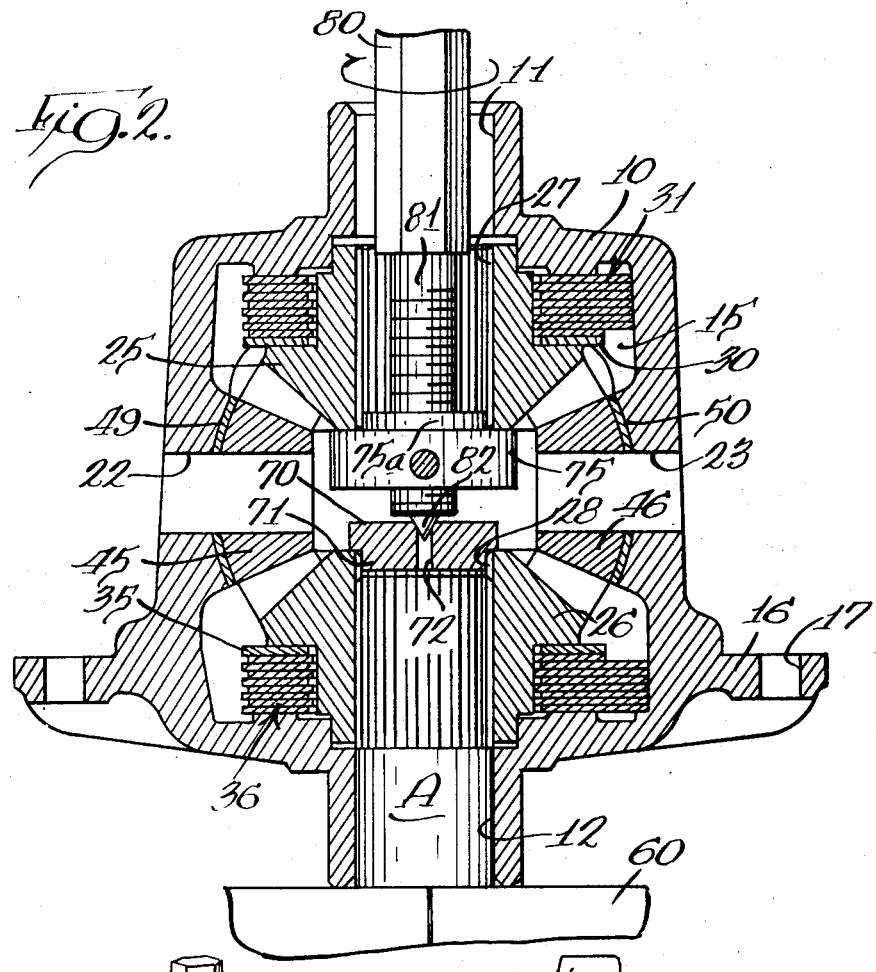
FIG. 2 is a view, similar to FIG. 1, showing the limited slip differential with the tool structure associated therewith.
Figure 4:
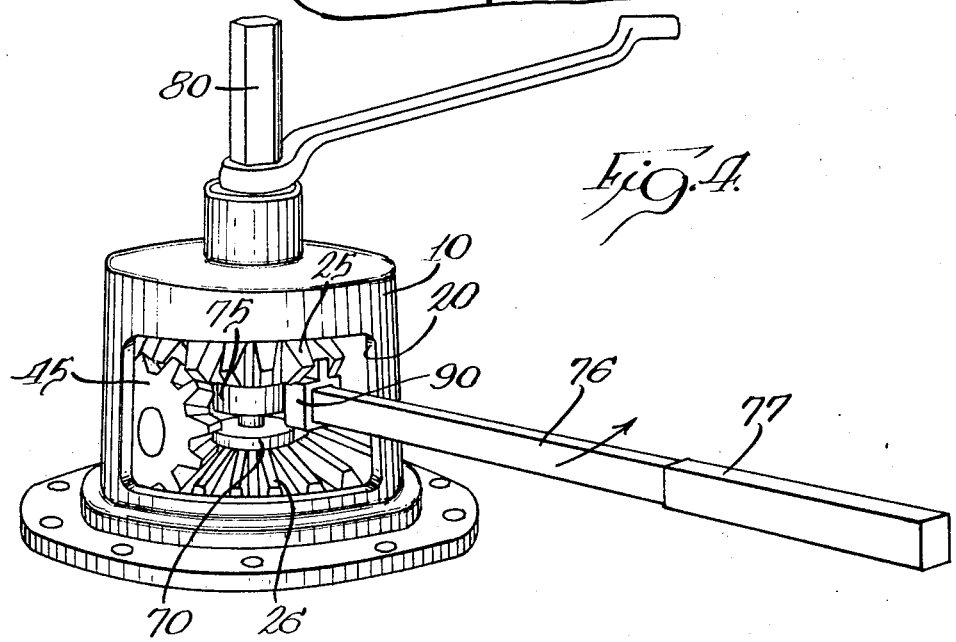
FIG. 4 is a perspective of the limited slip differential and tool.

The limited slip differential disclosed herein has recently come on the market and the specific structure disclosed is that offered by Dana Corporation under its trademark TRAC-LOK. A conventional differential transmits all of the ring gear torque through the differential gears to the axle shafts. The limited slip differential differs from the conventional differential in that part of the torque from the ring gear is transmitted through clutch packs between the side gears and the differential case. These clutch packs include disc clutches with radial grooves on the plates and concentric grooves on the discs which are engaged by a preload from Belleville springs plus separating forces from the side gears as torque is applied through the ring gear. This construction permits differential action when required for turning corners and transmits equal torque to both wheels when driving straight ahead. When one wheel tries to spin, due to leaving the ground, the clutch packs automatically provide more torque to the wheel which is not trying to spin.

More specifically, the limited slip differential embodies a differential case 10 having opposed axle-receiving openings 11 and 12 communicating with an interior chamber 15. An annular flange 16 has bolt-receiving openings 17 to which a ring gear (not shown) may be attached. The wall of the differential case 10 has a pair of side openings, one of which is shown at 20, of substantial peripheral dimension and a pair of pin-receiving openings 22 and 23 to receive a cross pin 24. A pair of side gears 25 and 26 are positioned within the differential case chamber, with each of these gears having splined axle-receiving openings 27 and 28, respectively. The splined opening 27 of the top side gear 25, as shown in FIG. 1, normally receives the inner end of one axle, while the splined opening 28 of the bottom side gear 26 receives the splined end of the other axle. Each side gear has a clutch pack and Belleville spring associated therewith. The top side gear 25 has the Belleville spring 30 engaging a flat surface on the side gear and a portion of the clutch pack with the clutch pack including plates and discs, indicated generally at 31, with the discs being splined to an exterior spline on the side gear. A similar clutch pack and Belleville spring are associated with the bottom side gear 26, with the spring identified at 35 and the clutch pack identified generally at 36. The side gears each have a series of teeth 40 and 41, respectively, which mesh with a pair of pinion mate gears 45 and 46 rotatable on the cross pin 24. The mate gears 45 and 46 are held in position by a pair of removable snap rings 47 and 48 and with the outer surfaces thereof spaced from the differential case 10 by spherical washers 49 and 50 having central openings through which the cross pin 24 extends.

In order to disassemble the limited slip differential, the unit is mounted, as shown in FIGS. 1 and 2, with an axle A mounted in a vise or similar holding device 60 and with only a limited amount of the splined end of the axle extending thereabove, whereby the differential case will be positioned with a portion of the axle-receiving opening 28 open.

The first step in disassembly is to remove the snap rings 47 and 48 manually by use of a screw driver or the like inserted through a side opening of the differential case, followed by knock-out of the cross pin.

The tool embodying the invention is then utilized in the subsequent disassembly steps. This tool embodies a step plate 70 having a concentric plug portion 71 which fits into the axle-receiving opening 28 of the bottom side gear 26 and with the step plate resting on the face of the side gear. Additionally, the step plate has a pilot recess 72. A second part of the tool comprises a circular member having an internally threaded opening to, in effect, define a forcing nut 75. The forcing nut 75 has a concentric plug portion 75a to fit into the axle-receiving opening 27 of the side gear 25. This nut has an elongate handle 76 attached thereto and of a length to extend out through one of the side openings in the differential case 10 and with a gripping portion 77. A forcing screw 80 has a threaded part 81 which engages in the threads of the forcing nut 75 and an upper multisided part for engagement by a wrench.

With the parts of the tool thus described, the next step after removal of the cross pin is to insert the step plate 70 into position, as shown in FIG. 2. By manually gripping the handle portion 77, the forcing nut is placed with its concentric plug portion 75a in the axle-receiving opening 27 of the side gear 25. The forcing screw 80 is then inserted through the axle-receiving opening 11 of the case and the axle-receiving opening 27 of the side gear 25 and the threads on the part 80 brought into threaded engagement with the forcing nut. Rotation of the forcing screw then brings a pilot 82 at the lower end of the forcing screw into the pilot recess 72. This holds the forcing screw firmly in position. Added rotation of the forcing screw then exerts forces on the side gears to urge them further apart and compress the Belleville springs 30 and 35. This increased space between the side gears permits the pinion mate gears 45 and 46 to move inwardly sufficient to free the spherical washers 49 and 50 whereby they may be pushed out from behind the pinion mate gears for removal from the case.

The forcing screw is them backed off to reduce the compression of the Belleville springs but still to maintain the forcing screw and step plate in firm engagement, since the forcing screw forms a rotation axis for the handle in the manner to be described.

The tool further includes a gear tooth engaging pawl 90 movably mounted on the handle 76 to and from a detented position defined by a notch 91 in the handle. In this detented position, the pawl 90 is positioned for engagement with a tooth on the top side gear 25. With this engagement, and upon rotation of the handle 76 along with resultant rotation of the forcing nut 75, the top side gear is caused to rotate. At this time, the bottom side gear 26 is held against rotation by its splined engagement with the axle which is locked in the vise. This rotation of the top side gear also causes rotation of the pinion mate gears 45 and 46 which thus walk along the bottom side gear 26. The arc of movement of the handle 76 is limited and more than one stroke of the handle may be required; thereby, the pawl 90 can be moved outward from its detented position to permit the handle to swing back to an initial position and the pawl then moved back into detented position for another stroke of the handle. This is repeated a sufficient number of times until the pinion mate gears are moved into alignment with the side openings 20 for removal from the differential case. Following removal of the pinion mate gears then the side gears and clutch packs can be removed.

From the foregoing, it will be seen that a method of disassembling a limited slip differential is provided wherein the steps include removal of the cross pin followed by positioning elements between opposing faces of the side gears 25 and 26 and actuating the elements, namely, the forcing screw, to exert forces urging the side gears apart and to compress the Belleville springs whereby the spherical washers behind the pinion mate gears can be removed. The forces are substantially released and one side gear is held against rotation whereby rotating the other side gear by the pawl carried on the rotatable handle rotates the pinion mate gears and the side gear to walk the pinion mate gears to a position where they can be removed.

The assembly of the limited slip differential follows the reverse of the procedure set forth for disassembly and it is believed that such steps are readily understood without detailed recitation thereof.

From the foregoing it will be seen that a tool has been provided which enables internal positioning of tool components within the differential case to separate the side gears sufficiently to permit removal of the washers associated with pinion mate gears and with this structure further defining a rotational axis for a handle carrying a pawl for rotating a side gear and the pinion mate gears to a removal position.

We claim:

1. A tool for assembly and disassembly of a limited slip differential having a pair of spaced-apart side gears meshing with a pair of pinion mate gears and with a clutch pack and Belleville spring between each side gear and the differential case comprising, a plate fittable against one side gear, an internally threaded nut fittable against the other side gear and having an elongate handle connected thereto for extension outwardly of the differential case, a forcing screw extendable through said nut and rotatably advanceable into interfitting engagement with the step plate with further rotation increasing the spacing between the side gears by compression of the Belleville springs to free the pinion mate gears for inward movement to remove washers associated therewith, and a pawl on said handle for engagement with a tooth on a side gear whereby rotation of said handle about an axis defined by the forcing screw causes rotation of the last-mentioned side gear and pinion mate gears until the pinion mate gears are walked to a position to permit removal through openings in the differential case.

2. A tool as defined in claim 1 wherein said pawl is movable relative to said handle to move into and out of engagement with a side gear tooth.

3. A tool as defined in claim 2 wherein said pawl is movable lengthwise of said handle, and coacting structure on the pawl and handle to hold the pawl in engagement with a side gear tooth.

4. An assembly and disassembly tool for a limited slip differential comprising, a step plate engageable with one side gear of said limited slip differential, an internally threaded member engageable with the other side gear of said limited slip differential, a forcing screw threadable into said member and engageable with the step plate whereby rotation of said forcing screw will force said side gears a further distance apart, a handle having a gear tooth engaging pawl adjustably positionable thereon for engaging a tooth of a side gear to cause rotation thereof as the handle is rotated about a central axis of the differential.

5. An assembly and disassembly tool for a limited slip differential comprising, a step plate engageable with one side gear of said limited slip differential, an internally threaded nut engageable with the other side gear of said limited slip differential, a forcing screw threadable into said nut and engageable with the step plate whereby rotation of said forcing screw forces said side gears a further distance apart, a handle extending from said nut, and a gear tooth engaging pawl adjustably positionable on the handle for engaging a tooth of a side gear to cause rotation thereof as the handle is rotated about an axis defined by the forcing screw.

6. A tool as defined in claim 5 wherein said step plate and forcing nut each has a concentric plug section to fit into the axle-receiving openings of their adjacent side gears.

7. A tool as defined in claim 5 wherein said step plate has a central pilot recess and said forcing screw has a conical pilot end engageable in said recess to hold the forcing screw in position during rotation of said handle and forcing nut about said forcing screw.

8. A tool as defined in claim 5 wherein said pawl is movable along said handle and the handle has detent means engageable with the pawl to hold the pawl in proper position when the pawl engages the side gear tooth.

9. A tool for assembly and disassembly of a limited slip differential having a pair of spaced-apart side gears meshing with a pair of pinion mate gears and with a clutch pack and Belleville spring between each side gear and the differential case comprising, a step plate fittable into the central axle-receiving opening of one side gear, an internally threaded nut fittable into the axle-receiving opening of the other side gear and having an elongate handle connected thereto for extension outwardly of the differential case, a forcing screw extendable through an end of said differential case and said nut and rotatably advanceable into interfitting engagement with the step plate with further rotation increasing the spacing between the side gears by compression of the Belleville springs to free the pinion mate gears for inward movement to remove washers associated therewith, and a pawl movable on said handle to a position to engage a tooth on a side gear whereby rotation of said handle about an axis defined by the forcing screw causes rotation of the last-mentioned side gear and pinion mate gears until the pinion mate gears are walked to positions to permit removal through openings in the differential case, said forcing screw having been backed off sufficient to relieve the compression on the Belleville springs but still in firm engagement with the step plate.

10. A tool as defined in claim 9 wherein said handle has detent means engageable with the pawl to hold the pawl in proper position on the handle when the pawl engages the side gear tooth.

11. A tool as defined in claim 9 wherein said step plate has a central pilot recess and said forcing screw has a conical pilot end engageable in said recess to hold the forcing screw in position during rotation of said handle.

12. A tool as defined in claim 9 wherein said step plate and forcing nut each has a concentric plug section to fit into the axle-receiving openings of their adjacent side gears.

13. A method for disassembly of a limited slip differential having a pair of spaced-apart side gears meshing with a pair of pinion mate gears and with a clutch pack and Belleville spring between each side gear and the differential case comprising, removing a cross pin passing centrally through the pinion mate gears, exerting forces on opposing faces of said side gears in directions to urge said side gears apart and compress the Belleville springs whereby the pinion mate gears can move inwardly to permit removal of spherical washers against and walk the latter on said one side gear until the pinion mate gears are positioned for removal between the differential case and said pinion mate gears, releasing said forces, holding one side gear against rotation, and rotating the other side gear to rotate said pinion mate gears and walk the latter on said one side gear until the pinion mate gears are positioned for removal through openings in the differential case, followed by removal of said side gears and associated structure from the differential case.

14. A method for disassembly of a limited slip differential having a pair of spaced-apart side gears meshing with a pair of pinion mate gears and with a clutch pack and Belleville spring between each side gear and the differential case comprising, removal of a cross pin passing through the pinion mate gears, positioning elements between opposing faces of said side gears and actuating said elements to exert forces in directions to urge said side gears apart and compress the Belleville springs whereby the pinion mate gears can move inwardly to permit removal of spherical washers between the differential case and said pinion mate gears, substantially releasing said forces, holding one side gear again rotation, and rotating the other side gear by a member connected to one of said elements to rotate said pinion mate gears are positioned for removal through openings in the differential case, followed by removal of said side gears and associated structure from the differential case.

* * * * *